United States Patent
Cadima et al.

(10) Patent No.: US 8,436,279 B2
(45) Date of Patent: May 7, 2013

(54) SYSTEM FOR SUPPLEMENTATION OF APPLIANCE STANDBY MODE WITH INTERNAL POWER SOURCE

(75) Inventors: Paul Bryan Cadima, Prospect, KY (US); Lawrence Michael Portaro, Louisville, KY (US)

(73) Assignee: General Electric Company, Schenectady, NY (US)

( * ) Notice: Subject to any disclaimer, the term of this patent is extended or adjusted under 35 U.S.C. 154(b) by 372 days.

(21) Appl. No.: 12/949,859

(22) Filed: Nov. 19, 2010

(65) Prior Publication Data

US 2012/0061375 A1    Mar. 15, 2012

(51) Int. Cl.
  *H05B 1/02*   (2006.01)
  *H02J 7/00*   (2006.01)
  *H02J 7/04*   (2006.01)
  *F24C 7/08*   (2006.01)
(52) U.S. Cl.
  USPC ........... 219/412; 219/391; 219/485; 219/488; 219/497; 323/234

(58) Field of Classification Search .................. None
See application file for complete search history.

(56) References Cited

U.S. PATENT DOCUMENTS

2010/0092625 A1* 4/2010 Finch et al. .............. 99/325
2010/0194358 A1* 8/2010 Stanford-Clark ......... 323/234

FOREIGN PATENT DOCUMENTS

| CN | 201014597 | 1/2008 |
| CN | 201327090 | 10/2009 |
| JP | 2006112692 | 4/2006 |

* cited by examiner

*Primary Examiner* — Joseph M Pelham
(74) *Attorney, Agent, or Firm* — Dority & Manning, P.A.

(57) ABSTRACT

A system is provided for supplementing the power usage of an appliance with an internal power source, such as e.g., a battery, in order to limit the overall power consumption of the appliance while in standby mode. The system can allow for replenishing the internal power source when the appliance is not in standby mode or even when in standby mode if such will not exceed the external power source consumption limit. In the event the internal power source is not available or is reaching depletion, the system can provide for disabling electronic features of the appliance in order to maintain the external power source consumption below the desired limit.

18 Claims, 3 Drawing Sheets

SYSTEM FOR SUPPLEMENTATION OF APPLIANCE STANDBY MODE WITH INTERNAL POWER SOURCE

FIELD OF THE INVENTION

The present invention relates to a system for supplementing the power usage of an appliance with an internal power source, such as e.g., a battery, in order to limit the external power consumption of the appliance while in standby mode.

BACKGROUND OF THE INVENTION

Modern appliances, particularly kitchen appliances such as ovens, ranges and cook tops, are frequently provided with electronic features such as clocks, timers, and displays. These features require electricity not only when the appliance is in use but also when the appliance in not in use. More particularly, when not in use, an appliance enters into standby mode until the next event requiring operation of the appliance due to e.g., the user turning on the appliance or a timer activating the appliance. While in standby mode, the appliance still continues to consume a certain amount of energy to maintain operation of at least a portion of the electronics such as e.g., the clock or a timer and an associated display.

It is desirable to limit the amount of power that an appliance requires from an external supply during standby mode. For example, industry standards and/or government regulations may limit the maximum amount of power that an appliance can draw from the electrical power system of a home or business during standby mode. An external power consumption limitation of one watt, for example, may be required for certain appliances when in standby mode.

Unfortunately, the features associated with such electronics in many modern appliances require a certain minimal amount of power even during standby mode. This minimal amount may exceed the maximum power consumption limitation provided by industry standards and/or government regulations. While advances are being made in reducing the amount of power required by such appliance electronics during standby mode, these advances may not be able to provide electronics having all of the features desired by consumers while simultaneously reducing the power consumption during standby mode to a level that is below the maximum consumption limitation of industry standards and/or government regulations.

Accordingly, a method and apparatus for reducing the amount of energy that an appliance draws from an external power supply during standby mode is desirable. More particularly, a method and apparatus that allows an appliance to operate electronics as required during standby mode without drawing power from an external supply in an amount that exceeds a maximum external power consumption limitation would be useful.

BRIEF DESCRIPTION OF THE INVENTION

Aspects and advantages of the invention will be set forth in part in the following description, or may be obvious from the description, or may be learned through practice of the invention.

In one exemplary aspect, the present invention provides a method of supplementing power to an appliance. The method can include the steps of determining whether an appliance is in standby mode; providing power from an internal power source to one or more electronic components of the appliance when in the standby mode so as to prevent the external power consumption of the appliance from exceeding a predetermined external power consumption limit of the standby mode; and replenishing the internal power source without causing the appliance to exceed the predetermined external power consumption limit when in standby mode.

In another exemplary embodiment, the present invention provides an appliance configured with an external power consumption limitation, EPCL, during a standby mode of the appliance. This exemplary appliance includes at least one feature that operates when the appliance is not in a standby mode and at least one electronic feature that continues to operate when the appliance is in standby mode. The appliance also includes at least one internal power source. At least one processing device is provided and is configured to determine when the appliance is in standby mode; provide power from the internal power source to the at least one electronic feature during the standby mode when needed to prevent the appliance from exceeding the ECPL during the standby mode; and replenish the internal power source without causing the appliance to exceed the predetermined external power consumption limit of the standby mode.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
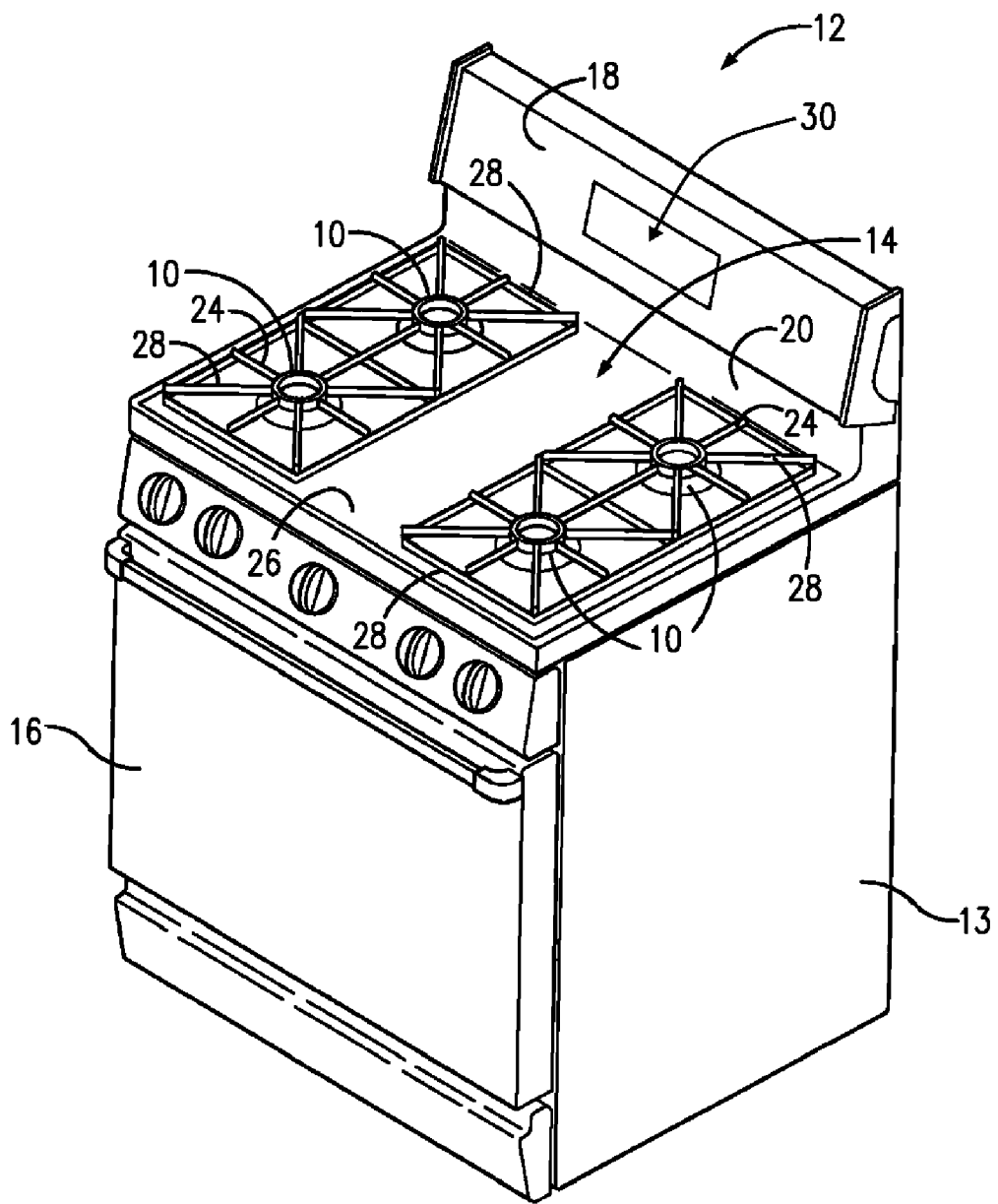
FIG. 1 provides an exemplary embodiment of an appliance having a supplementation system according to the present invention.

The present invention relates to a system for supplementing the power usage of an appliance during its standby mode. The system uses an internal power source, such as e.g., a battery, to supply power so as to limit the external power consumption of the appliance while in standby mode. The system can allow for replenishing the internal power source when the appliance is not in standby mode or even when in standby mode if such will not exceed the external power source consumption limit. In the event the internal source is not available or is reaching depletion, the system can provide for disabling electronic features of the appliance in order to maintain the external power source consumption below the desired limit. Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a gas range appliance 12 that includes an exemplary embodiment of a system for supplementing an appliance with an internal power source during standby mode. Gas range appliance 12 is provided by way of example only. The present invention may be used with other appliances including ovens, cook tops, washing machines, dryers and other appliances that can consume power during a standby mode and that are subject to an external power consumption limit or EPCL.

Range 12 includes an outer body or cabinet 13 that incorporates a generally rectangular cook top 14. An oven, not shown in detail, is positioned below cook top 14 and has a front-opening access door 16. A range backsplash 18 extends upward of a rear edge 20 of cook top 14 and contains various control selectors (not shown) for selecting operative features of heating elements for cook top 14 and the oven.

Cook top 14 includes four gas fueled burners 10, which are positioned in spaced apart pairs positioned adjacent each side of cook top 14. A recessed area 24 of cook top 14 surrounds each burner 10. Recessed area 24 is positioned below an upper surface 26 of cook top 14 and serves to catch any spills from cooking vessels (not shown in FIG. 1) being used with cook top 14. Each burner assembly 10 extends upwardly through an opening in recessed areas 24, and a grate 28 is positioned over each burner 10. Each grate 28 includes a flat surface thereon for supporting cooking vessels and utensils over burner assemblies 10 for cooking of meal preparations placed therein. For purposes of describing the invention, four burners 10 as might be used on a kitchen stove appliance are depicted. However, using the teachings disclosed herein, one of skill in the art will understand that the present invention may be used with e.g., a different number of burners 10, electric heating elements instead of burners, and even different appliances as well.

Backsplash 18 also includes a display 30 that may be provided with a variety of features for appliance 12. Display 30 may include a clock, timer, temperature information, and other features as desired. Also, a variety of other electronic features can also be provided with appliance 12 that may or may not require use of display 30. For example, appliance 12 may have various gas detection sensors throughout appliance 12 to determine whether a leak is present. Such features, along with the oven, may be controlled by an electronic range control that may include one or more processing devices.

The electronic features require that appliance 12 is connected to an external power supply for continued operation. Typically, appliance 12 will be connected by electrical wiring to the power supply system of the building or structure containing appliance 12. For example, appliance 12 may be connected to a supply of 120 volts and/or 220 volts of alternating current to operate appliance 12 along its electronic features. In the case of an appliance that does not use gaseous fuel, such as an all electric range or oven, the external power supply will also be used to power these features of the appliance during operation as well.

When burners 10 and the oven of appliance 12 are not operating, appliance 12 is in a state that is referred to herein as a standby mode. More particularly, when the primary use or function of appliance 12 (in this example, providing heat for the cooking of food) has been switched off by the user, then appliance 12 is in a standby mode. As such, the appliance remains in standby mode until the user activates one or more features such as a burner 10 and/or the oven.

During standby mode, appliance 12 will continue to consume external power (i.e. energy) to operate one or more electronic features. For example, if appliance 12 includes a clock with an electronic readout in display 30, this feature will require power even when appliance 12 is in standby mode. Similarly, timers and/or other features may be included that continue to consume energy during the operation of the appliance 12.

As previously indicated, industry standard and/or government regulations may require that the external power consumption of appliance 12 is limited when in the standby mode. More particularly, an external power consumption limit for the standby mode of appliance 12 may be imposed. By way of example, in 1999 the International Energy Agency (IEA) proposed 1 watt as an external power consumption limit for all appliances when in standby mode. Other limitations may be used with the present invention as well.

Frequently, however, the external power consumption requirement of an appliance during standby mode will exceed the external power consumption limit such as the 1 watt limit proposed by the IEA. The appliance may need to exceed the external power consumption limit only for brief intervals or such may be more continuous during the standby mode. Regardless, in order to meet an external power consumption limit that is less than the power needed by the appliance during standby mode, the present invention provides a system for continuing to operate such electronic features of the appliance during standby mode.

More particularly, appliance 12 is provided with a system for supplementing the external power supply in order to avoid exceeding the external power consumption limit during standby mode. An internal power supply (not shown) such as a battery, capacitor, or other energy storage device is provided that can store power for use during standby mode. Such internal power supply is replenished (e.g., recharged) when appliance 12 is not in standby mode or even during standby mode if replenishing can be provided during standby mode without exceeding the external power consumption limit. A processing device such as a microprocessor or other controller (not shown) can be configured to provide for such operations of appliance 12.

It should be understood that as used herein, "internal" does not require that the internal power supply must be located within appliance 12 such as within cabinet 13. Instead, "internal" is used to distinguish from the external power supply provided by e.g., the external power distribution system to which appliance 12 is connected. As such, the internal power supply is preferably contained within the casing or cabinet 13 of appliance 12 but may be located exterior thereto as well.

Figure 2:
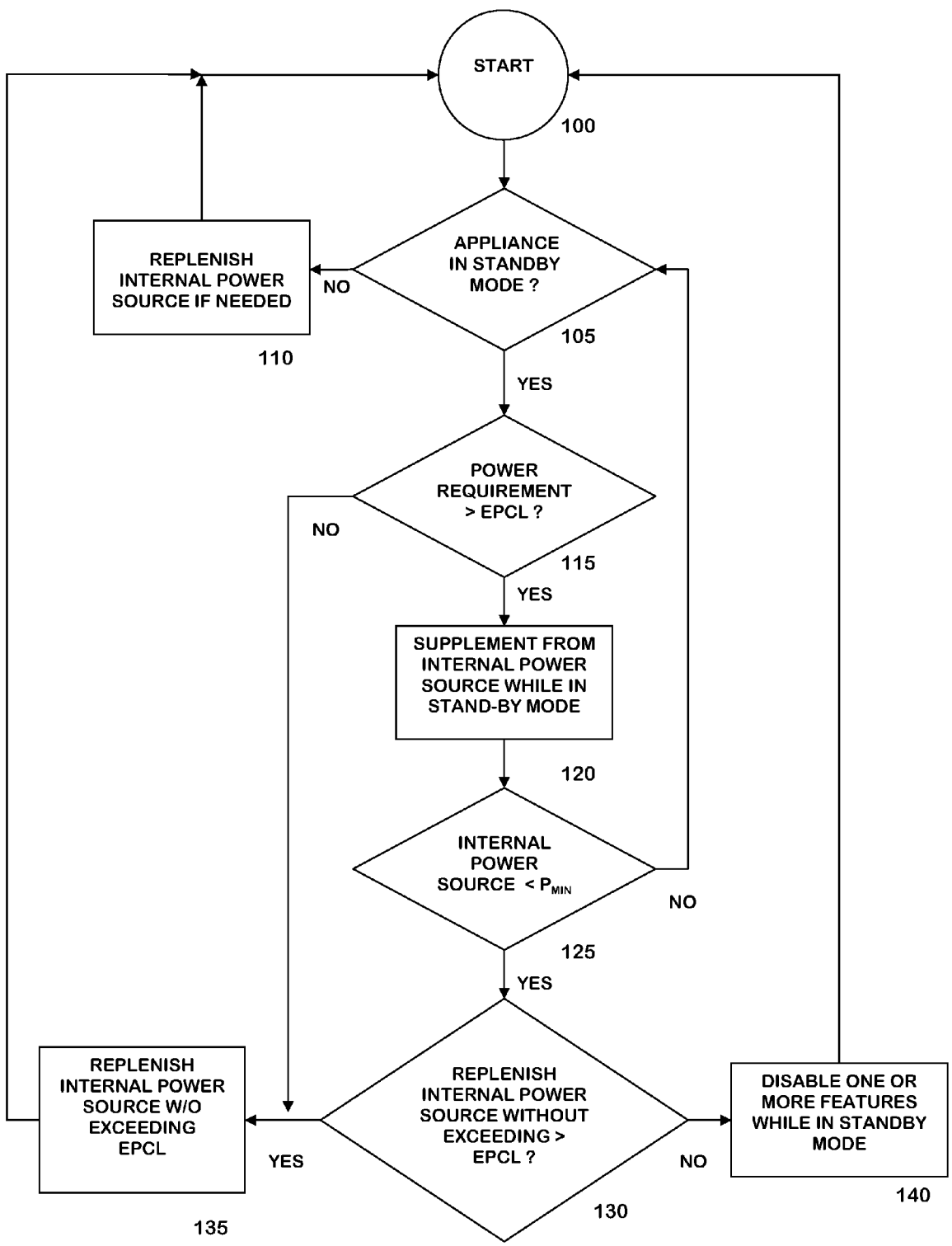
FIG. 2 provides a flow chart illustrating an exemplary method of supplementation of the present invention.

FIG. 2 provides a flow chart illustrating an exemplary method of operating appliance 12 so as to supplement its power consumption during standby mode. For example, appliance 12 may be provided with an electronic range control having a processing device configured to operate as shown in FIG. 2. From start 100, the processing device determines whether appliance 12 is in standby mode in step 105. More specifically, appliance 12 determines whether both burners 10 and the oven are currently turned off. If appliance 12 is not in standby mode, then in step 110 the processor checks to determine whether the internal power source (e.g., battery, capacitor, etc.) is fully charged. In this way, the power level of the internal power source is maintained so that such is available when needed during standby mode.

If appliance 12 is in standby mode, then in step 115 the processor determines whether the current power requirement or power usage of appliance 12 is greater than the external power consumption limit, or EPCL, for standby mode. If the current power requirement is not greater than the EPCL, then appliance 12 can continue to use power from an external power source without supplement. In such case, the processor continues to monitor the power requirements of appliance 12 while it remains in standby mode to make sure the EPCL is not exceeded. Additionally, because the EPCL is not being exceeded, appliance 12 can proceed to step 135, where the internal power source is replenished (if needed) without exceeding the EPCL. By way of example, assume the EPCL is one watt and the appliance is in standby mode. If appliance 12 is only consuming 0.5 watt in standby mode, then up to 0.5 watt is available for replenishing the internal power source.

However, if the current power requirement of appliance 12 does exceed the EPCL, then the appliance needs to supplement the external power supply so not to exceed the EPCL. Accordingly, in step 120, appliance 12 begins to supplement the external power from the internal power source during standby mode so as to avoid exceeding the EPCL. In the event the power requirements of appliance 12 drop back below the EPCL during the standby mode, appliance 12 can return to relying solely upon the external power source. For example, if the EPCL is 1 watt and the appliance needs 1.25 watts during all or some portion of the standby mode, then appliance 12 can allow the internal power source to provide 0.25 watts so that the EPCL is not exceeded. If appliance 12 only needs 0.75 watts during the standby mode, then the internal power supply is not needed and appliance 12 can continue operation using an external power source until appliance 12 is no longer in standby-by mode or until the internal power supply is needed.

Depending upon e.g., the amount of power required during the standby mode, the length of the standby mode, and/or the amount of power that is stored by the internal power source, the use of the internal power source during the standby mode could eventually deplete the internal power source if remedial actions are not taken. Accordingly, in step 125, appliance 12 monitors the internal power source to determine if its power level has dropped below a predetermined value $P_{min}$. For example, if the internal power source is a battery, a processor in appliance 12 may determine whether the voltage has fallen below a certain predetermined voltage value.

If the internal power source has not dropped below predetermined value $P_{min}$, then appliance 12 continues to monitor whether the appliance is in standby mode and if power must be supplemented. However, if the internal power source has dropped below $P_{min}$, then before taking remedial action, appliance 12 determines in step 130 whether the internal power source can be replenished without exceeding the EPCL. If so, then in step 135 appliance 12 proceeds to replenish the internal power source (e.g., charge the battery) and continues to monitor whether appliance 12 is in standby mode. If the internal power source cannot be replenished without exceeding the EPCL, then in step 140 appliance 12 begins to disable one or more features of appliance 12 that are operating during the standby mode so as to lower the power requirements of the appliance.

For example, a processor can be programmed to disable features until e.g., the power requirements during standby mode are reduced by half or eliminated completely. Superfluous or less important features may be eliminated first. Other techniques for reduction may be used as well. Any features disabled during step 140 can be reactivated as part of e.g., step 110 once appliance 12 is no longer in standby mode and the internal power source is being replenished. Alternatively, some features may be restored during the standby mode if the internal power source has been replenished.

FIG. 2 is provided by way of example only. Using the teachings disclosed herein, one of ordinary skill in the art will understand that other methods may be used within the scope of the present invention as well. By way of further example, assume appliance 12 has gas burners 10 while the oven includes electrically powered heating elements. Appliance 12 could be configured to provide for replenishing the internal power source when gas burners 10 are being used even though the oven is turned off—because the use of gas burners 10 would mean the appliance is not in standby mode.

Figure 3:
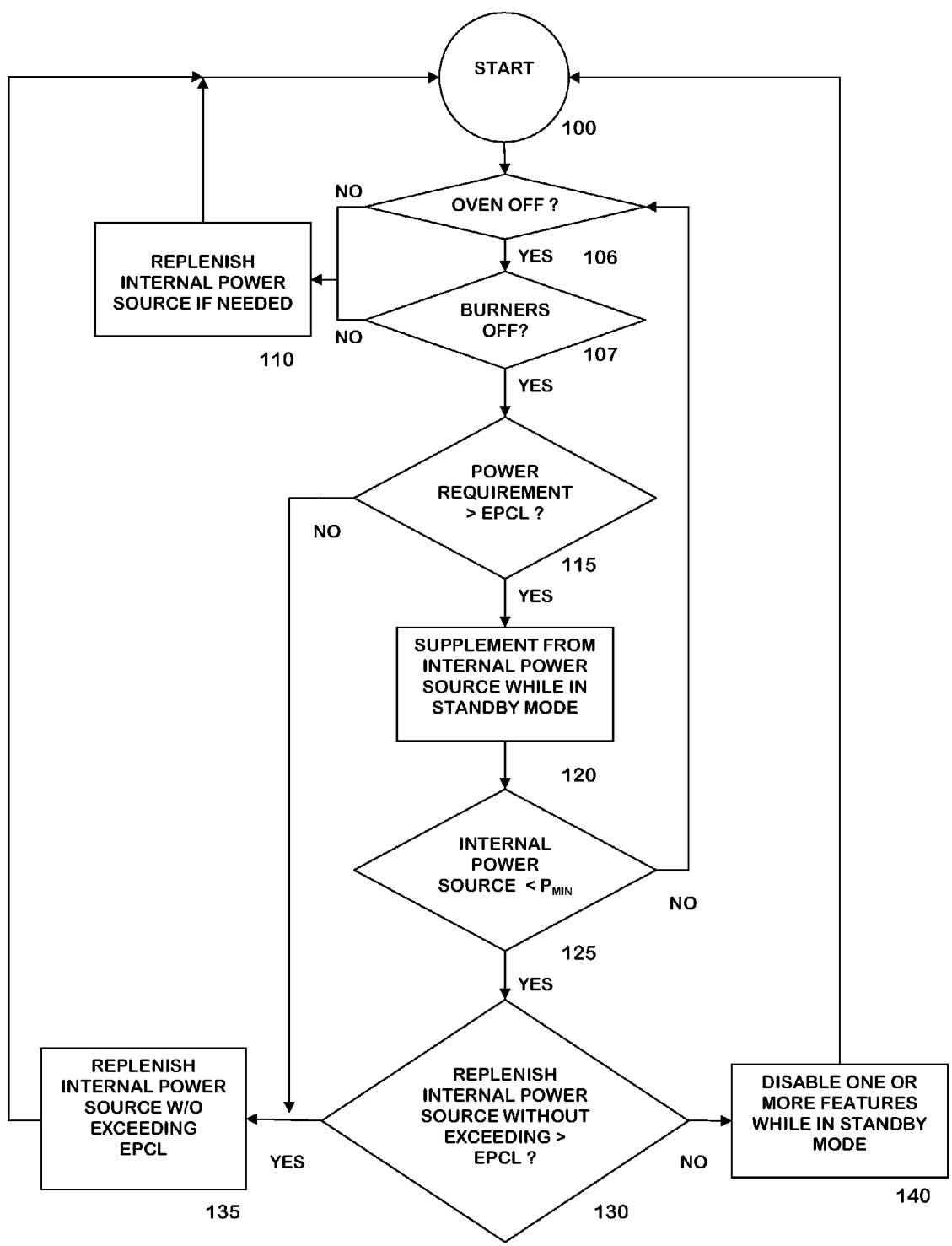
FIG. 3 provides a flow chart illustrating another exemplary method of supplementation of the present invention.

Accordingly, FIG. 3 provides an additional flow chart illustrating a modification of the exemplary method of FIG. 2. More specifically, in step 106, the appliance 12 determines whether the oven is off. If the oven is on, appliance 12 is not in standby mode and the internal power source can be replenished as in step 110. If the oven is off, the appliance then determines if all burners 10 are off in step 107. If any burner is on, then appliance 12 is not in standby mode and the internal power source can be replenished as in step 110—even if the oven is off. Alternatively, if the burners 10 and oven are off, appliance 12 proceeds to step 115 as previously described with FIG. 2.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of supplementing power to an appliance, comprising the steps of:
    determining whether an appliance is in standby mode;
    providing power from an internal power source to one or more electronic components of the appliance when in the standby mode so as to prevent the external power consumption of the appliance from exceeding a predetermined external power consumption limit of the standby mode; and
    replenishing the internal power source without causing the appliance to exceed the predetermined external power consumption limit when in standby mode.

2. A method of supplementing power to an appliance as in claim 1, further comprising the step of measuring the amount of power consumption of the appliance during the standby mode.

3. A method of supplementing power to an appliance as in claim 2, wherein said replenishing step further comprises replenishing the internal power source during the standby mode if the measured amount of power consumption of the appliance is below the external power consumption limit.

4. A method of supplementing power to an appliance as in claim 1, wherein said determining step further comprises monitoring the appliance to determine if a user has activated a feature of the appliance so as to cause the appliance move out of the standby mode and, if so, then conducting said step of replenishing.

5. A method of supplementing power to an appliance as in claim 1, wherein the appliance is a range having at least one oven and at least one burner, and wherein said determining step comprises detecting whether said at least one burner, said at least one oven, or both are in use and, if so, then conducting said step of replenishing.

6. A method of supplementing power to an appliance as in claim 1, wherein said internal power source is a battery.

7. A method of supplementing power to an appliance as in claim 6, wherein said step of replenishing comprises charging said battery.

8. A method of supplementing power to an appliance as in claim 1, wherein the predetermined external power consumption limit for standby mode is 1 watt.

9. A method of supplementing power to an appliance as in claim 1, further comprising the step of terminating one or more power consuming features during the standby mode if replenishing the internal power source would cause external power consumption of the appliance to exceed the external power source consumption limit during the standby mode.

10. An appliance configured with an external power consumption limitation, EPCL, during a standby mode of the appliance, the appliance comprising:
   at least one feature that operates when the appliance is not in a standby mode;
   at least one electronic feature that continues to operate when the appliance is in standby mode;
   at least one internal power source; and
   at least one processing device configured to
      determine when the appliance is in standby mode;
      provide power from the internal power source to said at least one electronic feature during the standby mode when needed to prevent the appliance from exceeding the ECPL during the standby mode; and
      replenish the internal power source without causing the appliance to exceed the predetermined external power consumption limit of the standby mode.

11. An appliance as in claim 10, wherein said processing device is further configured to measure the amount of power consumption of the appliance during the standby mode.

12. An appliance as in claim 10, wherein said processing device is further configured to replenish the internal power source during the standby mode if the measured amount of power consumption of the appliance is below the external power consumption limit.

13. An appliance as in claim 10, wherein said processing device is further configured to determine if a user has activated a feature of the appliance so as to cause the appliance to move out of the standby mode and, if so, then to allow for the replenish of the internal power source.

14. An appliance as in claim 10, wherein the appliance is a range having at least one oven and at least one burner, and wherein said processing device is configured to detect whether the at least one burner, the at least one oven, or both are in use and, if so, then to allow for the replenish of the internal power source.

15. An appliance as in claim 10, wherein said internal power source is a battery.

16. An appliance as in claim 10, wherein said internal power source is a capacitor.

17. An appliance as in claim 10, wherein the predetermined external power consumption limit for standby mode is 1 watt.

18. An appliance as in claim 10, wherein said processor is further configured to terminate one or more power consuming features during the standby mode if replenishing the internal power source would cause external power consumption of the appliance to exceed the external power source consumption limit during the standby mode.

* * * * *